United States Patent [19]
Sakaegi et al.

[11] Patent Number: 5,223,942
[45] Date of Patent: Jun. 29, 1993

[54] IMAGE PROCESSING APPARATUS

[75] Inventors: Yuji Sakaegi, Kawasaki; Makoto Kondo, Yokohama, both of Japan

[73] Assignee: Canon Kabushiki Kaisha, Tokyo, Japan

[21] Appl. No.: 575,877

[22] Filed: Aug. 31, 1990

[30] Foreign Application Priority Data

Aug. 31, 1989 [JP] Japan .................................. 1-225140
Aug. 30, 1990 [JP] Japan .................................. 2-229682

[51] Int. Cl.⁵ .............................................. H04N 9/80
[52] U.S. Cl. ........................................................ 358/310
[58] Field of Search ................... 358/310, 330, 11, 12, 358/142, 141, 147

[56] References Cited
U.S. PATENT DOCUMENTS 4,490,749  12/1984  Hirota ................................. 358/330
4,870,509   9/1989  Nagasawa et al. .

Primary Examiner—Donald E. McElheny, Jr.
Attorney, Agent, or Firm—Fitzpatrick, Cella, Harper & Scinto

[57] ABSTRACT

An image processing apparatus includes a recording process circuit for applying a recording process based on given luminance data and color data, a reproducing process circuit for applying a reproducing process on the given luminance data and color data, and an image memory used in common for the recording process circuit and the reproducing process circuit. The state of write-in into or read-out from the image memory on at least one of the luminance data and the color data is varied according to the state of operation of the recording process circuit and the reproducing process circuit. A processing time difference between a time of processing of the luminance data and a time of processing of the color data is compensated for by the recording process circuit and the reproducing process circuit.

6 Claims, 9 Drawing Sheets

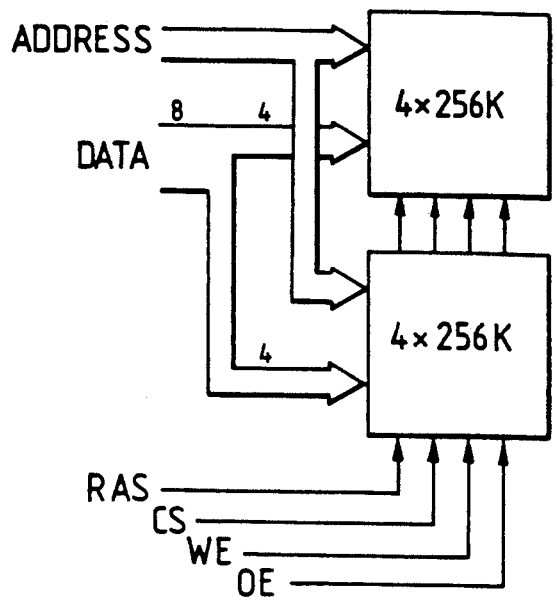
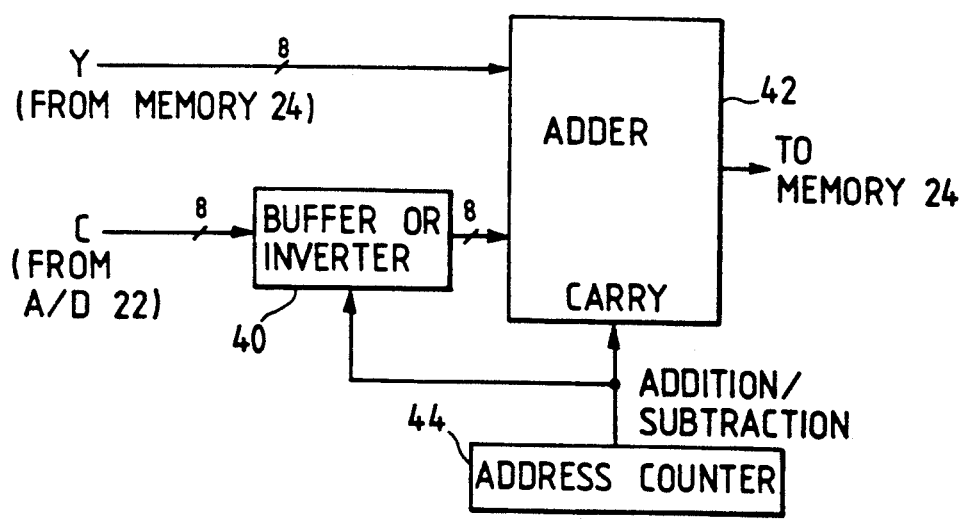

◯ : PIXEL CHANGED DURING 2nd. FIELD

+RY : ONE DERIVED BY ADDING R-Y DERIVED AS A RESULT OF A/D TO Y

-RY : ONE DERIVED BY SUBTRACTING R-Y DERIVED FROM A/D FROM Y

◯ : PIXEL SAMPLED DURING 2nd. FIELD PERIOD

☐ : PIXEL SAMPLED DURING 3rd. FIELD PERIOD

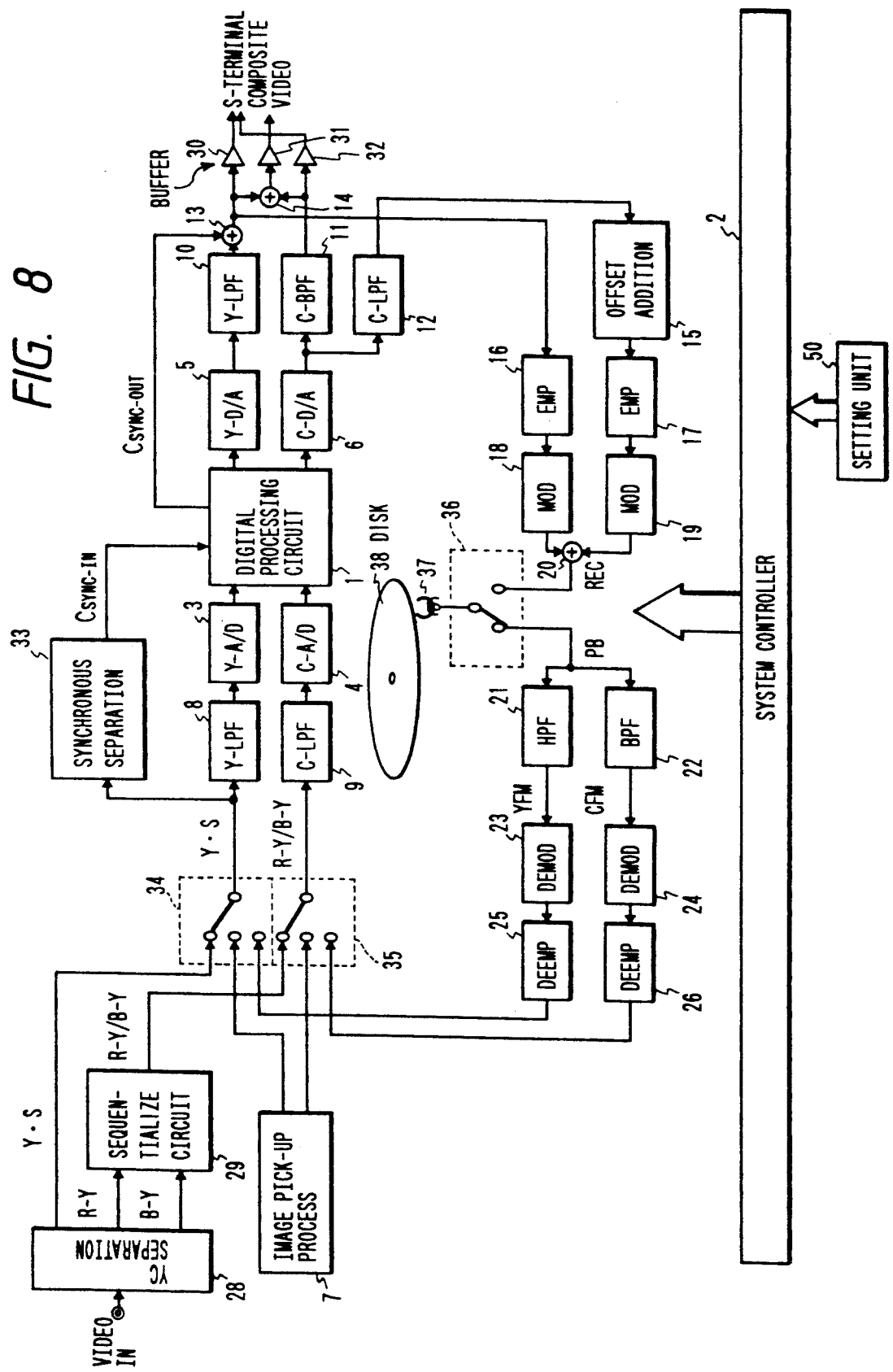

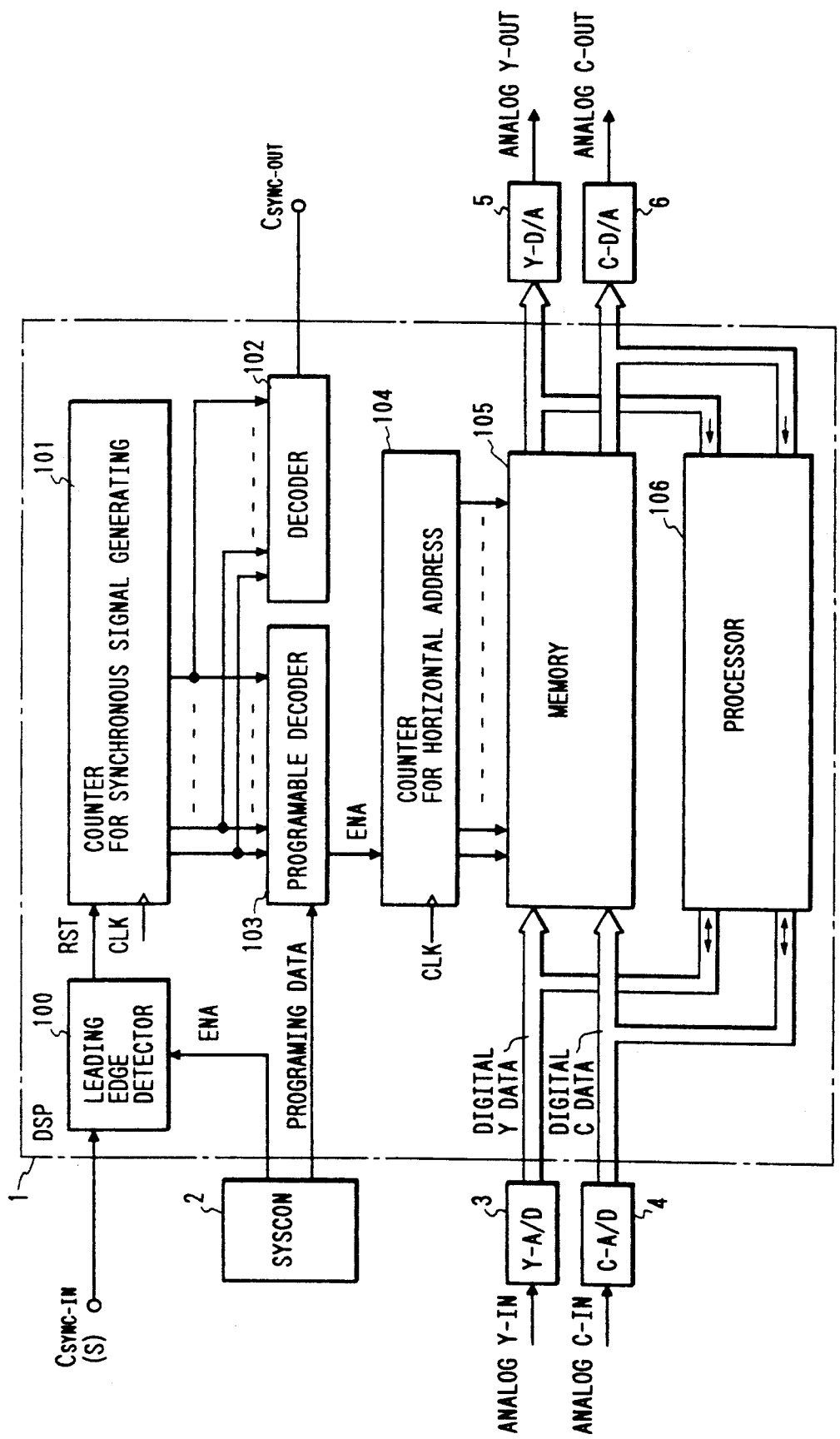

(RECORDING STEP)

(READING OUT FROM SENSOR)

(OUT OF PROGRAMABLE DECODER)

(PROCESSING OF Y-SIGNAL)

(PROCESSING OF C-SIGNAL)

(REPRODUCTION PROCESS)

(READING OUT BRIGHTNESS SIGNAL FROM DISK AND STORING IT INTO MEMORY)

(READING OUT COLOR-DIFFERENCE SIGNAL FROM DISK AND STORING IT INTO MEMORY)

(READING OUT SIGNAL FROM MEMORY AND OUTPUTTING IT TO EXTERNAL UNIT)

IMAGE PROCESSING APPARATUS

BACKGROUND OF THE INVENTION

1. Field of the Invention

The present invention relates to an image processing apparatus.

2. Related Background Art

The magnetic disk called still video floppy disk records a still image by separately frequency modulating the luminance signal and the line-sequential color difference signal and frequency multiplexing these signals. Consequently, for obtaining an NTSC standard video signal, for example, in a reproducing apparatus, it is necessary to separate the frequency multiplexed FM signal into the luminance component and the color difference component, separately frequency demodulate these components, convert the line-sequential color difference signal into a line-simultaneous signal, and convert these components into the standard video signal.

Based on the recent advent of digital image processing technology, there is proposed a circuit structure for storing the reproduced signal in a frame memory and conducting various image signal processings such as conversion of the line-sequential color difference signal into line-simultaneous signal or conversion into the standard television signal, on said frame memory. For example there are proposed a structure for storing the reproduced luminance signal in a frame memory in a first field, then storing the reproduced (line-sequential) color difference signal in the frame memory in a second field, effecting digital signal processing on the data stored in the frame memory for obtaining luminance data and two color difference data, and converting these data into analog signals which are converted into the NTSC standard video signal by an NTSC encoder, and a structure for forming a digital video signal for display on real-time basis from the luminance data and the line-sequential color difference data stored in the frame memory, and converting said digital signal into an analog signal.

However, such conventional structures require a very large memory capacity, since all the luminance data and the line-sequential color difference data constituting an image have to be stored in the frame memory. Also a large amount of data that has to be read within a unit time requires a high-speed memory and a data bus of a large data width, so that it has been difficult to reduce the cost of the apparatus in such conventional structures.

Besides it is difficult, in the former structure, to reduce the cost, size and power consumption as there are required D/A converters and analog encoders for example of NTSC standard in three channels. Also the latter structure is very expensive as a digital processing circuit of a very high speed is required for NTSC conversion of the signal on real-time basis.

Such drawbacks exist not only in the still video image processing apparatus mentioned above but also in other various reproducing apparatus.

Also in the conventional structures, in order to compensate the time difference resulting from the difference in frequency band of the processing of luminance signal and that of color difference signal at the recording, and also to compensate the similar time difference, for example between the demodulation of luminance signal and that of color difference signal at the signal reproduction, there is usually inserted, in the luminance signal system, a delay device corresponding to the time difference between the processing circuits.

However, in the conventional structures, the use of analog delay devices providing different delay times for recording and reproduction results in the following drawbacks:

(1) A delay device capable of passing the luminance signal of a wide bandwidth is difficult to obtain, and such delay device is expensive even it is available;

(2) The use of an exclusive delay device in each of the recording circuit and the reproducing circuit increases the number of component parts, eventually leading to a difficulty in part mounting and to bulkiness of the apparatus; and (3) A further increase in the number of component parts is unavoidable if an external image signal is to be recorded.

SUMMARY OF THE INVENTION

An object of the present invention is to provide an image processing apparatus capable of resolving the above-mentioned drawbacks entirely or individually.

Another object of the present invention is to provide an apparatus capable of precise high-speed processing of an image signal with a simple structure.

Still another object of the present invention is to provide an apparatus capable of high-speed processing of an externally given luminance signal and color signal with a simple structure.

The foregoing objects can be attained, according to a preferred embodiment of the present invention, by an image processing apparatus comprising:

a) means for repeatedly supplying luminance data and color data;

b) means for storing, in a memory, either of the luminance data and color data of a predetermined period; and c) means for calculating, in a predetermined period next to the above-mentioned predetermined period, video data of a predetermined format from the other of the luminance data and color data and the data stored in said memory.

Still another object of the present invention is to provide an apparatus capable of suitable processing in each process mode with a simple structure.

Still another object of the present invention is to provide an apparatus capable of setting a suitable delay time in each process mode with a simple structure.

The foregoing objects can be attained, according to a preferred embodiment of the present invention, by an image processing apparatus comprising:

a) process means for processing luminance data and color data in independently determined process modes; and b) means for regulating the time difference generated in the processing of the luminance data and color data by the process means, with variable regulating state according to the process modes.

The foregoing and still other objects of the present invention, and the advantages thereof, will become fully apparent from the following description of the embodiments which is to be taken in conjunction with the attached drawings.

BRIEF DESCRIPTION OF THE DRAWINGS

FIG. 3 is a block diagram of the memory 24;

FIG. 4 is a block diagram of an NTSC encoder contained in a digital signal processing and memory control circuit 26;

FIG. 8 is a block diagram showing another embodiment of the present invention;

FIG. 9 is a block diagram showing the internal structure of a digital processing circuit 1 shown in FIG. 8;

DETAILED DESCRIPTION OF THE PREFERRED EMBODIMENTS

Now the present invention will be explained in greater detail by embodiments thereof shown in the attached drawings.

Figure 1:
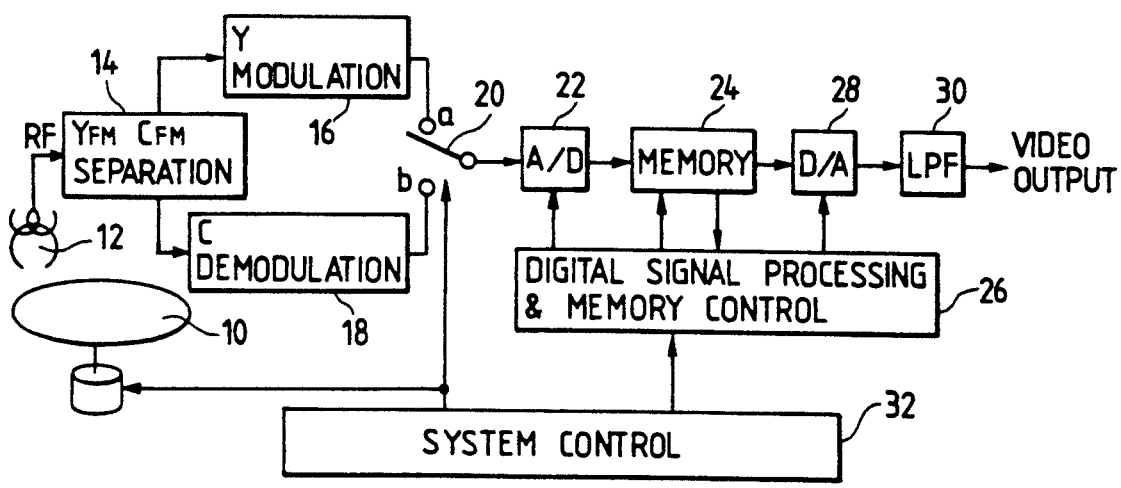
FIG. 1 is a block diagram of a first embodiment of the present invention.

FIG. 1 is a block diagram of an embodiment of the present invention, wherein shown are a magnetic disk 10 called a still video floppy disk; a reproducing head 12; a Y/C separating circuit 14; a demodulation circuit 16 for frequency demodulation of the luminance component of the reproduced signal; a demodulation circuit 18 for frequency demodulation of the line-sequential color difference component of the reproduced signal; a selector switch 20 for selecting the output of the demodulation circuit 16 or 18; an A/D converter 22; a memory 24; a digital signal processing and memory control circuit 26 for controlling the memory 24 and forming an NTSC video signal from the output of the A/D converter 22 and the data stored in the memory 24; a D/A converter 28; a low-pass filter (LPF) 30 for eliminating unnecessary band component; and a system control circuit 32 for controlling the entire apparatus.

In the present embodiment, a track of the magnetic disk 10, in which a desired image is recorded, is reproduced plural times, and the reproduced signals are subjected to fetching of luminance data and line-sequential color difference data in the memory 24 as will be explained later, and also to conversion into a line-simultaneous signal and into an NTSC signal.

Figure 2:
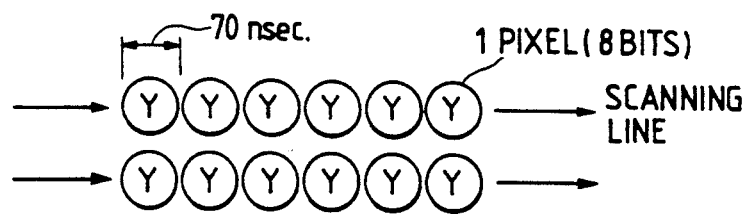
FIG. 2 is a schematic view showing the timing of fetching of luminance data into a memory 24.

At first, in a field period, the switch 20 is connected to the contact a, thereby supplying the output (luminance component) of the demodulation circuit 16 to the A/D converter 22 and storing it in the memory 24. If the sampling rate of the A/D converter 22 is $4f_{sc}$, the storage of a pixel in the memory 24 has to be conducted in about 70 nsec as shown in FIG. 2, but such rate is easily achievable in an ordinary DRAM with a page mode or a static column mode. FIG. 3 is a block diagram of the memory 24, which is composed, in the present embodiment, of two chips of 1 Mbit general-purpose DRAM (for static column mode) of 4×256 Kbits. Use of an 8-bit bus in such structure allows to store 8-bit data into the memory 24 with 70 nsec in a continuous manner as shown in FIG. 2.

The refreshing of the memory can be conducted in the image blanking period, and such refreshing method will not be explained further as it is already well known.

After the reproduced luminance data are fetched in the memory 24 in the first field period, the switch 20 is connected to the contact b in a second field period to supply the output (reproduced line-sequential color difference signal) of the demodulation circuit 18 to the A/D converter 22 for digitizing. The digital signal processing and memory control circuit 26 reads, simultaneously with the A/D conversion of the reproduced line-sequential color difference signal, the luminance data from the memory 24 and forms an NTSC signal by addition/subtraction of said luminance data and line-sequential color difference data. FIG. 4 shows the structure of a digital NTSC encoder provided for this purpose in the digital signal processing and memory control circuit 26. There are provided a circuit 40 functioning as a buffer in the addition or as an inverter in the subtraction; an adder 42; and an address counter 44.

Figure 5:
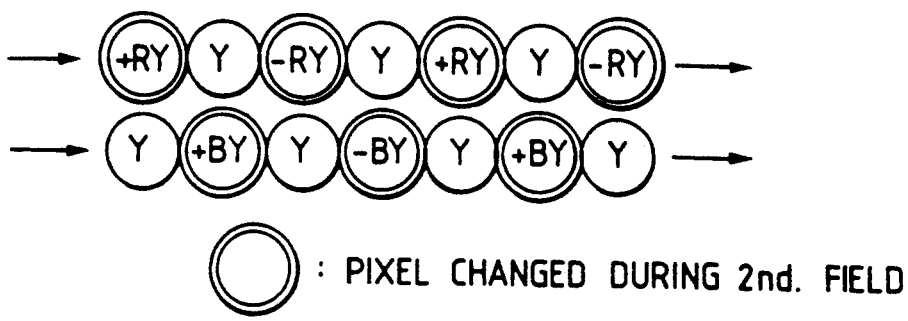
FIG. 5 is a schematic view showing the result of calculation in a second field period.

The result of addition or subtraction in the circuit shown in FIG. 4 is written in the same address of the memory 24. This operation corresponds to a read-modify-write operation in the page mode or the static column mode. In an ordinary general-purpose DRAM with a read or write cycle of 60–70 nsec, the read-modify-write cycle cannot be applied to all the luminance data as it takes about 120–130 nsec. However, in the format of the still video floppy disk, said cycle can be applied to every other pixel, since the color difference signal is line-sequentially recorded. This is because the orthogonal modulation is conducted in the order of R-Y, B-Y, −(R-Y) and −(B-Y) in case of sampling of 70 nsec/pixel, and the modulation on the pixel B-Y is not possible if the line-sequential recording contains R-Y only. In the above-explained operation, the addition and subtraction alternate in the processing of the luminance data and color difference data, because of the nature of the orthogonal modulation. Thus, after the processing in the second field period, the memory 24 contains data as shown in FIG. 5.

Figure 6:
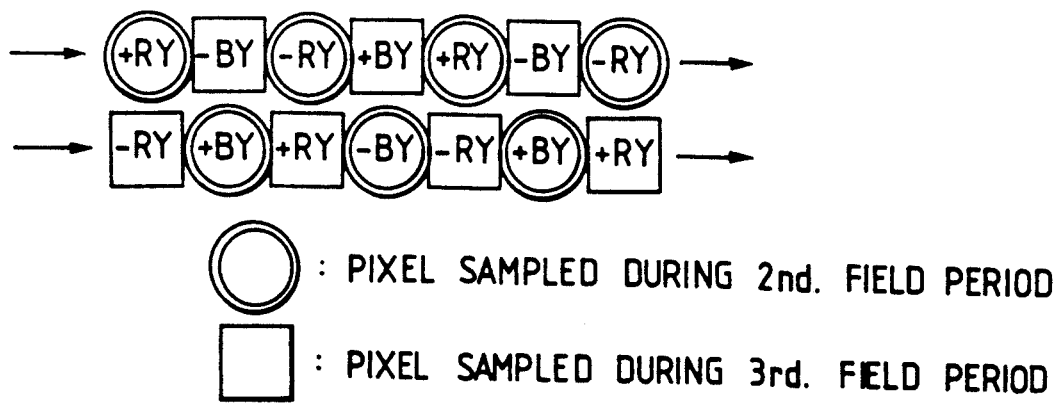
FIG. 6 is a schematic view showing the result of calculation of a third field period.

In a succeeding 3rd field period, the position of the scanning line and the vertical address of the memory 24 are moved by one in comparison with the processing in the 2nd field period. Consequently, a modulation B-Y is applied to lines subjected to a modulation R-Y in the 2nd field period, and a modulation R-Y is applied to lines subjected to a modulation B-Y in the 2nd field period. Thus, at the end of the processing of the 3rd field period, the memory 24 contains data as shown in FIG. 6.

In a 4th field period and the thereafter, the data stored in the memory are simply read in continuous manner and supplied to the D/A converter 28. The data from the memory 24 are converted into analog signals by the D/A converter 28; and are subjected to elimination of unnecessary band by the LPF 30, thereby providing an analog NTSC signal. Since all the necessary signals are stored in the memory 24, it is possible to stop the magnetic disk and to interrupt the power supply to the separating circuit 14, demodulation circuits 16, 18 and A/D converter 22.

Figure 7:
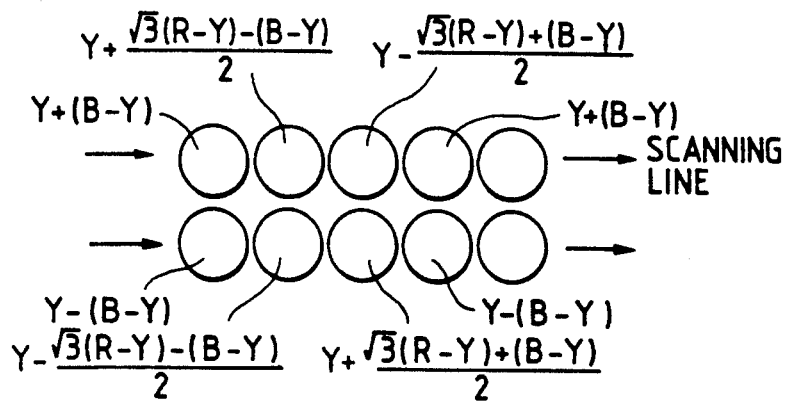
FIG. 7 is a view showing data arrangement on the memory 24 at $3f_{sc}$ sampling.

In the foregoing there has been explained the sampling with $4f_{sc}$, but the sampling may also be conducted with $3f_{sc}$. In such case, however, there is required a processing as shown in FIG. 7, instead of simple alternation of addition and subtraction. In this operation $3\frac{1}{2}$ can be approximated by $1-2^{-3}-2^{-7}$, so that the processing in this case is not much more difficult than in the case of sampling with $4f_{sc}$.

The present embodiment allows the use of a low-speed memory, thereby reducing the cost and the power consumption, because the number of bits to be read from the memory per unit time can be reduced in a prolonged reproducing operation.

In the present embodiment, the reproduced luminance signal is processed and stored in the memory at first, and said luminance signal is again read from the memory at the succeeding processing of the reproduced color difference signal, but it is also possible to store the reproduced color difference signal into the memory at first. Such method can be realized by increasing the read/write rate of the memory. Also in the present embodiment the NSTC encoded image signal is stored in the memory, but it is also possible, in the present invention, to store the image signal in another memory.

As will be easily understood from the foregoing, the present embodiment allows reduction of the memory capacity, since the reproduced data are converted into the video signal before storage in the memory.

In the following there will be explained a 2nd embodiment of the present invention with reference to FIG. 8, which is a block diagram of the entire apparatus constituting said 2nd embodiment.

The embodiment shown in FIG. 8 is provided with a digital signal processor (DSP) 11 of which structure will be explained later with reference to FIG. 9.

A system controller 2 controls the function of various units of the entire apparatus according to an operation mode set by a setting unit 50, such as an external input mode, a camera recording mode or a reproduction mode.

In the following various units will be explained further, in the order of flow of the image signal. As image pickup process circuit 7 is provided with a photoelectric conversion device, such as a color CCD, for receiving light entering an optical system (not illustrated) such as a phototaking lens, a diaphragm etc., and generates a luminance signal Y, an added signal Y+S of a synchronization signals R-Y and B-Y.

The signals Y+S, R-Y/B-Y from the image pickup process circuit 7 are supplied through switches 3, 4 to Y-LPF 8 and C-LPF 9 for elimination of distortion and noises. A/D converters 3, 4 are provided for A/D conversion respectively of the outputs of said Y-LPF 8 and C-LPF 9 with frequencies suitable for respective signal bands. A synchronization signal separating circuit 33 separates the synchronization signal contained in the signal Y+S, for supply to a digital processing circuit.

The digital processing circuit 1 processes the input signal and generates a synchronization signal CSYNC-OUT, a luminance signal Y and a color signal C. D/A converters 5, 6 are provided for D/A conversion respectively of the luminance signal and the color signal released from the digital processing circuit 1.

The digital processing circuit 1 releases a simultaneous color signal in the reproduction mode, and a line-sequential color difference signal R-Y/B-Y in the recording mode.

A low-pass filter (LPF) 10 for luminance signal and a band-pass filter (BPF) 11 for color signal are provided for band limitation of the simultaneous color signal, more specifically for generating a signal of a band containing frequencies comparable to the frequency of the sub-carrier.

There are also provided an LPF 12 for processing the line-sequential color difference signal; an adder 13 for adding the synchronization signal CSYNC-OUT from the digital processing circuit 1 and the output of the LPF 10; an adder 14 for adding the outputs of the adder 13 and of the BPS 11 for obtaining a composite video signal; and output buffers 30, 31, 32 in which the output of the buffers 30, 32 is connected to an S-terminal, while the output of the buffer 31 is connected to an output terminal for the composite video signal.

There are further provided an offset addition circuit 15 for adding an offset to the line-sequential color difference signal from the LPF 12; emphasis circuits 16, 17; modulation circuits 18, 19 for signal conversion for recording on a medium; an adder 20 for adding the outputs of the modulation circuit 18, 19; and a selector switch 36 for connecting a head 37 either to a recording circuit or to a reproducing circuit.

In the following there will be explained the reproducing circuit to be connected to the head 37. There are provided a high-pass filter 21 and a band-pass filter 22 for respectively extracting the luminance signal and the color signal from the reproduced output of the head 37; demodulation circuits 23, 24; e-emphasis circuits 25, 26 of which outputs are supplied, respectively through switches 34, 35 to the aforementioned LPF's 8, 9; a separating circuit 28 for separating the luminance signal and the color signal from an externally entered video signal; and a sequential conversion circuit 29 for converting the signals, separated by the separating circuit 28, into line-sequential signals.

In the following there will be explained the details of the digital processing circuit 1, with reference to FIG. 9.

Referring to FIG. 9, there are provided a leading edge detector 100 for detecting the leading edge of the entered synchronization signal S; a counter 101 for counting clock signals and to be reset by the output of said detector 100; a decoder 103 for decoding the output of the counter 101 according to program data from the system controller 2 and generating an enable signal ENA; a decoder 102 similar to 103, for generating a composite synchronization signal according to the result of decoding; a memory 105 for storing the outputs of the A/D converters 3, 4; a counter 104 for controlling the address of the memory 105; and a processor 106 for processing the output signal of the memory 105.

In the following there will be explained the recording operation of the above-explained record/reproducing circuit, for the image signal from the integral image pickup circuit 7, with reference to a timing chart shown in FIG. 11.

At first the image pickup process circuit 7 generates a luminance signal containing necessary composite synchronization signal and a line-sequential color difference signal, which are respectively transmitted through input selector switches 34, 35 and subjected to elimination of unnecessary signals in the Y-LPF 8 and C-LPF 9. These analog luminance signal and analog color difference signal are converted into a luminance signal and a color difference signal of digital form, respectively in a luminance A/D converter (YAD) 3 and a color difference A/D converter (CAD) 4. These digital luminance signal and color difference signal are processed, as will be explained later, by the digital signal processor 1, and are again converted into analog signals respectively by a luminance D/A converter (YDA) 5 and a color difference signal D/A converter (CDA) 6. These signals are respectively subjected to the elimination of digital carrier (sampling clocks) in the Y-LPF2 10 and C-LPF 12. Then the luminance signal is subjected to the addition, in the adder 13, of a composite synchronization signal. Also the line-sequential color difference signal is subjected to the addition, by the offset addition circuit 15, of an offset for each horizontal scanning period. These processes provide a luminance signal and a color difference signal matching the base bands of the format of the still video floppy disk. Said signals are then emphasized by the emphasis circuits 16, 17, then modulated by the modulation circuits 18, 19, mutually added by the adder 20, and supplied through the switch 36 to the magnetic head 37 for recording on the magnetic disk 38.

The function inside the digital signal processor 1 will be explained in the following.

Inside the DSP 1, there are executed correction of color temperature, contour enhancement in the vertical and horizontal directions, noise elimination, conversion of line-sequential color difference signal into simultaneous color difference signal etc. by means of the processor 106 utilizing the memory 105. At the entry into the DSP 1, there is a time difference between the luminance signal and the color difference signal, because of the difference in the bands of the Y-LPF1 8 and C-LPF1 9. There will result a color aberration in the recording signal if the digital signals are stored in the memory 105 and read therefrom without correction of the time difference. In the present embodiment, therefore, the time difference between the luminance signal and the color difference signal is corrected at the signal storage in the memory 105 or at the signal read-out therefrom. More specifically, in the present embodiment, the signal storage in the memory 105 and the signal read-out therefrom are conducted with a fixed timing with respect to the composite synchronization signal, and the afore-mentioned time difference between the luminance signal and the color difference signal is absorbed by varying the write-in address of the memory with respect to the leading edge of the composite synchronization signal when the luminance signal or color difference signal, after being read from the memory 105 and processed (such as contour enhancement or filtering) in the processor 106, is again stored in the memory 105. This process will be explained in more detail in the following. When the composite synchronization signal S separated in the synchronization signal separator 33 is entered from a terminal CSYNC-IN of the DSP 1, the leading edge detector 100 detects the leading edge of the composite synchronization pulse and resets a counter 101 for generating a composite synchronization signal synchronized with the image signal processed in the DSP 1. The composite synchronization signal, synchronized with the image signal processed in the DSP 1 can be obtained by decoding the output of said counter with the decoder 102. The recording and the reproduction can be achieved with the signal if the time difference does not exist between the luminance signal and the color difference signal. In practice, however, the following operations are conducted for eliminating the time difference.

Figure 11A:
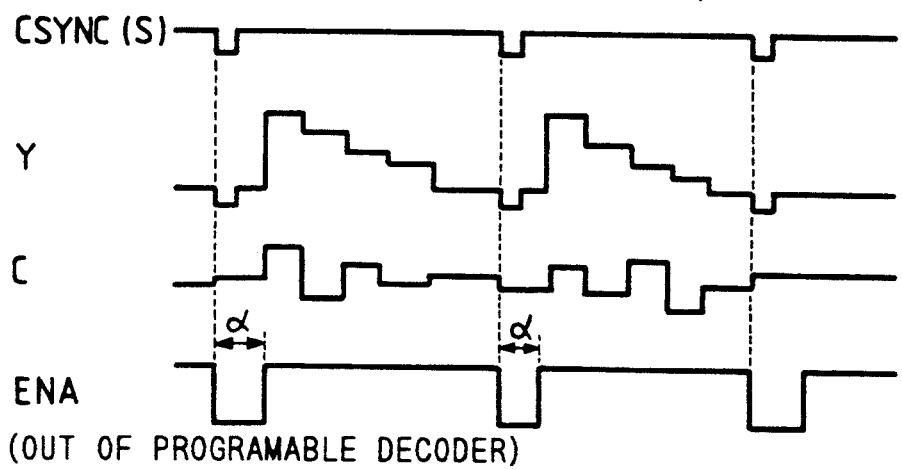
FIGS. 11A to 11C are timing charts showing the function of the circuit shown in FIG. 9 in a recording mode.

At the storage of the luminance signal and the color difference signal from the image pickup process circuit into the memory, the system controller 2 sets the programmable decoder 103 in such a manner as to generate a gate signal (enabling signal with a delay $\alpha$ from the leading edge of the synchronization pulse) for fetching the effective portion of the image signal (FIG. 11A).

Figure 11B:
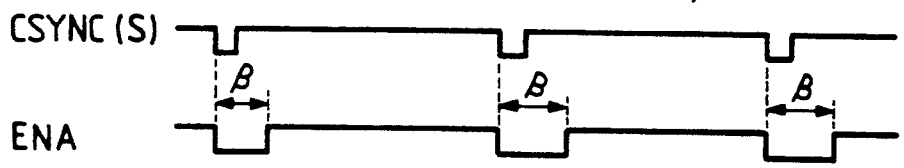
Figure 11C:
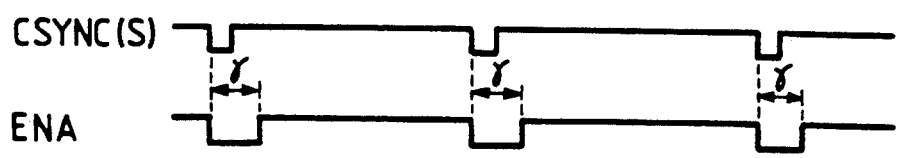

Then, at the processing of the luminance signal by the processor 106 and the memory 105, the programmable decoder 103 is set in such a manner that the enable signal is activated with a delay $\beta$ from the leading edge of the synchronization pulse (FIG. 11B). At the processing of the color difference signal by the processor 106 and the memory 105, the programmable decoder 103 is set in such a manner that the enable signal is activated with a delay $\gamma$ from the leading edge of the synchronization signal (FIG. 11C).

The value $\beta - \gamma$ corresponds to the time difference between the luminance signal and the color difference signal, resulting from the Y-LPF1 8 and the C-LPF1 9. As the result of these processes, the memory 105 stores the luminance signal and the color difference signal which have been subjected to the above-mentioned processes and the correction of time difference therebetween. Among the above-mentioned values $\alpha$, $\beta$ and $\gamma$, there stands a relation $\alpha \approx \beta$, in addition to the relation that $\beta - \gamma$ corresponds to the time difference between the luminance signal and the color difference signal.

Also when the selector switches 34, 35 are connected to an external signal, it is separated into the luminance signal and the color difference signal by the YC separator, and a color signal is extracted from the color difference signal in each horizontal synchronization period. The subsequent process is same as that for the signal from the image pickup process circuit 7, and will not, therefore, be explained further. However, the time difference between the luminance signal and the color difference signal is not same as before, so that the system controller sets the programmable decoder 103 at a suitable value for such case.

In the following there will be explained the function when the selector switches 34, 35, 36 are set in the reproducing mode.

The modulated image signal reproduced by the magnetic head 37 from the disk 38 is transmitted by the switch 36, and is separated by the filters 21, 22 into a modulated luminance signal and a modulated line-sequential color difference signal. These signals are demodulated into base band signals by the demodulators 23, 24, then de-emphasized by the de-emphasis circuits 25, 26, and are supplied to the YAD 3, CAD 4 through the YLPF1 8 and CLPF1 9. The image signals digitized by the YAD 3, CAD 4 are supplied to the DSP 1 for effecting conversion of line-sequential color difference signal into a simultaneous signal, compensation of lacking signal, noise reduction, modulation of color difference signal of the color sub-carrier etc., and are again converted into analog signal in the YDA 5 and CDA 6. These analog signals are subjected to the elimination of the carrier (sampling clock signal) by the Y-LPF 10 and the BPF 11 for the modulated color sub-carrier, then the composite synchronization signal is added to the luminance signal, and the resulting signals are released from so-called S-terminal If necessary, the luminance signal after the addition of said composite synchronization signal and said modulated color subcarrier may be added in the adder 14 to obtain the composite video signal.

Figure 12A:
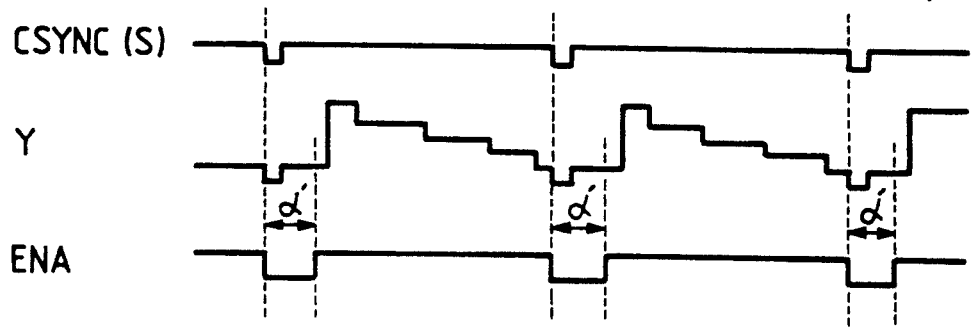
FIGS. 12A to 12C are timing charts showing the function of the circuit shown in FIG. 9 in a reproduction mode.
Figure 12B:
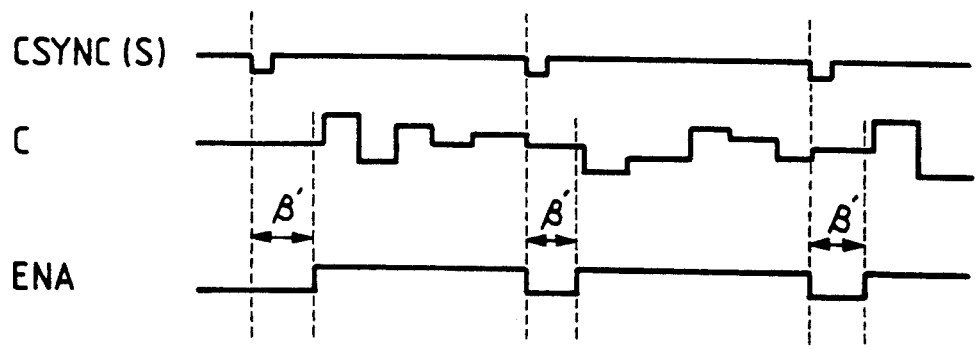
Figure 12C:
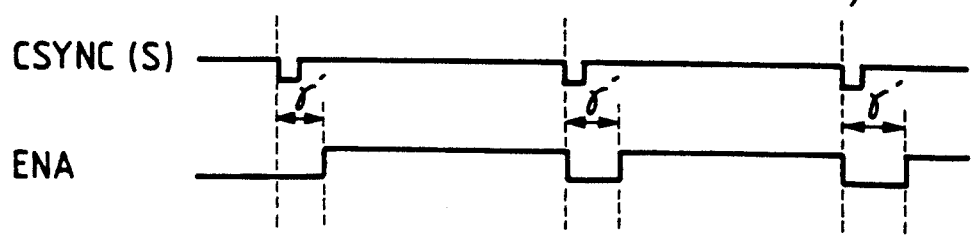

In the following there will be explained the process in the DSP 1 in the reproduction state, with reference to FIG. 12. The formation of the composite synchronization signal synchronized with the image signal after processing in the DSP 1 will not be explained as it is identical with that in the recording mode.

At first, at the storage of the luminance signal reproduced from the disk and demodulated, the enable signal of the counter 104 is generated with a delay $\alpha'$, different from $\alpha$ in the recording mode, from the leading edge of the CSync (S) signal separated in the synchronization signal separator 33. In the present embodiment, for eliminating the noise in the luminance signal, the signal is repeatedly read from the disk and stored with cumulative addition in the memory. Then, at the storage of the color difference signal, reproduced from the disk and demodulated, into the memory, the enable signal of the counter 104 is generated with a delay $\beta'$, different from $\alpha$ in the reproducing mode or $\beta$ in the recording mode, from the leading edge of the CSync (S) signal. The difference between $\alpha'$ and $\beta'$ corresponds to the time difference between the luminance signal and the color difference signal, generated for example in the demodulating circuit in the reproducing mode. At the signal read-out from the memory, an image signal with correction for the time difference between the luminance signal and the color difference signal can be obtained by signal reading with a delay $\gamma'$ from the leading edge of the CSync (S) signal.

In the following there will be explained a variation, shown in FIG. 10, of the circuit shown in FIG. 9. Other structures are same as those shown in FIG. 1.

Figure 10:
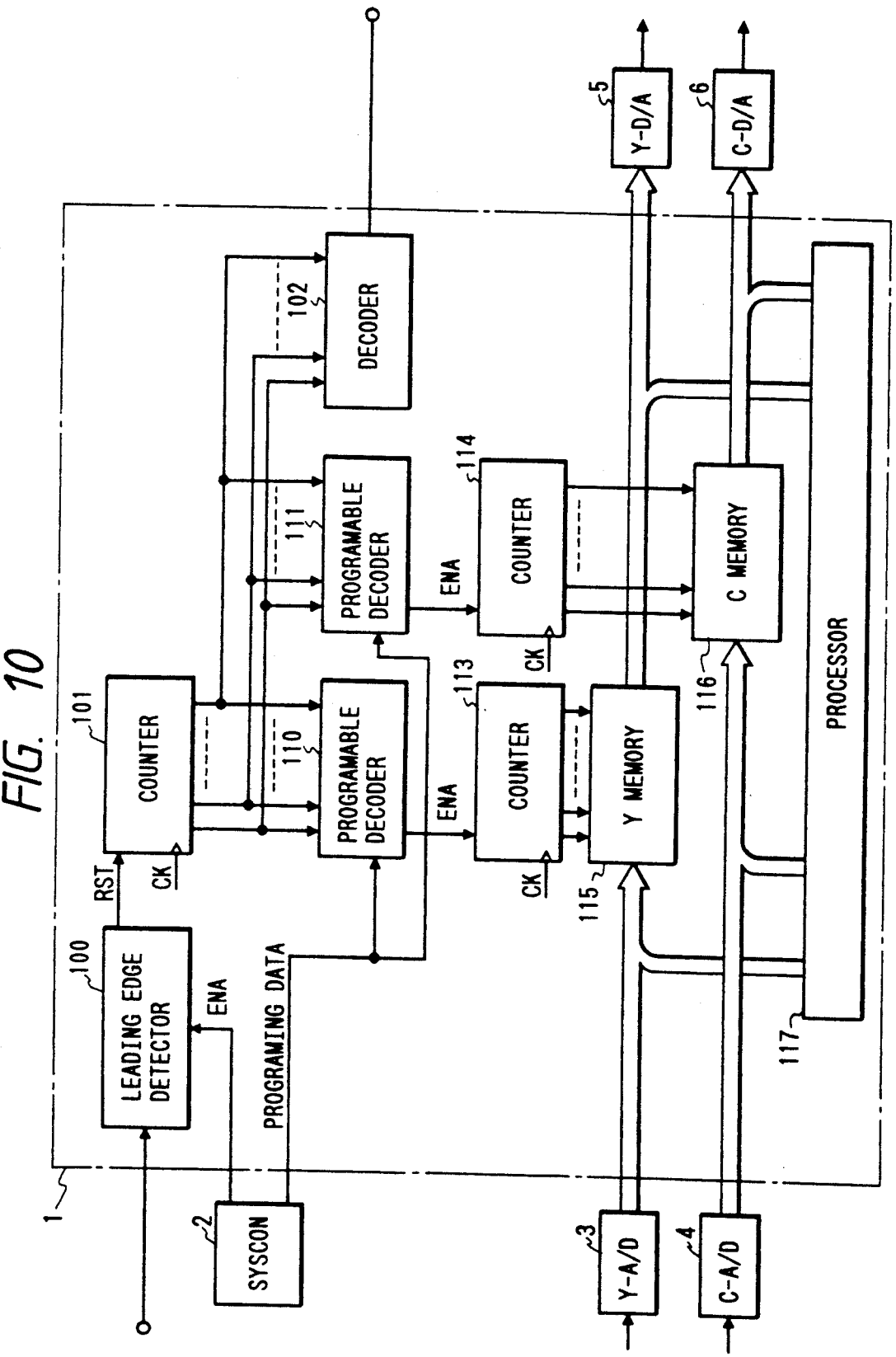
FIG. 10 is a block diagram showing another example of the circuit shown in FIG. 9.

In the variation shown in FIG. 10, there are provided a memory 115 for the luminance signal, a memory 116 for the color difference signal, decoders 110, 111 and counters 113, 114.

In this variation, the delay time for the start of counting of the memory address, from the leading edge of the CSync (S) signal, can be independently set for the luminance signal and the color difference signal, so that the correction for the time difference between the signals is possible without fetching of all the data into the memory in the recording mode, as in the 1st embodiment. This is achieved, in the data storage from the sensor into the memory, by generating enable signals with a delay shown in FIG. 11B for the luminance signal and a delay shown in FIG. 11C for the color difference signal. This method allows to reduce the time required for recording.

In the following there will be explained a 3rd embodiment of the present invention. Since the 1st or 2nd embodiment is not designed for a particular composite video signal, the second adder 14 adds, in the signal reproduction, the luminance signal containing the composite synchronization signal and the signal obtained by modulating the color subcarrier with the color difference signal. However, if the NTSC system with sampling clocks of $4f_{sc}$ alone is considered, it is possible to obtain the composite video signal of the NTSC format simultaneously with the recording of the color difference signal into the memory, by adding or subtracting the color difference signal to or from the luminance signal with correction of the time difference as already explained in relation to FIGS. 1 to 7, at the storage of the color difference signal from the disk into the memory following the storage of the luminance signal as explained in the 1st embodiment. Such structure allows to simplify the apparatus, though the signal corresponding to the S-terminal cannot be obtained In the foregoing embodiments, the CSync (S) signal required for the DSP 1 is obtained by extraction from the Y, S signals in the synchronization signal separator 33, but it may naturally be obtained, in the recording operation, from the synchronization signal generated in the image pickup process circuit. Also once the image signal after correction of the time difference is obtained in the memory, the signal read-out from said memory may naturally be conducted by a CSync signal obtained from an independent generator provided in the DSP 1. In such case, once the signal read-out from the memory by the CSync signal from said independent generator, the function of the disk 38, demodulators 23, 24, ADC's 3, 4 etc. may be terminated to reduce the power consumption.

Figure 13:
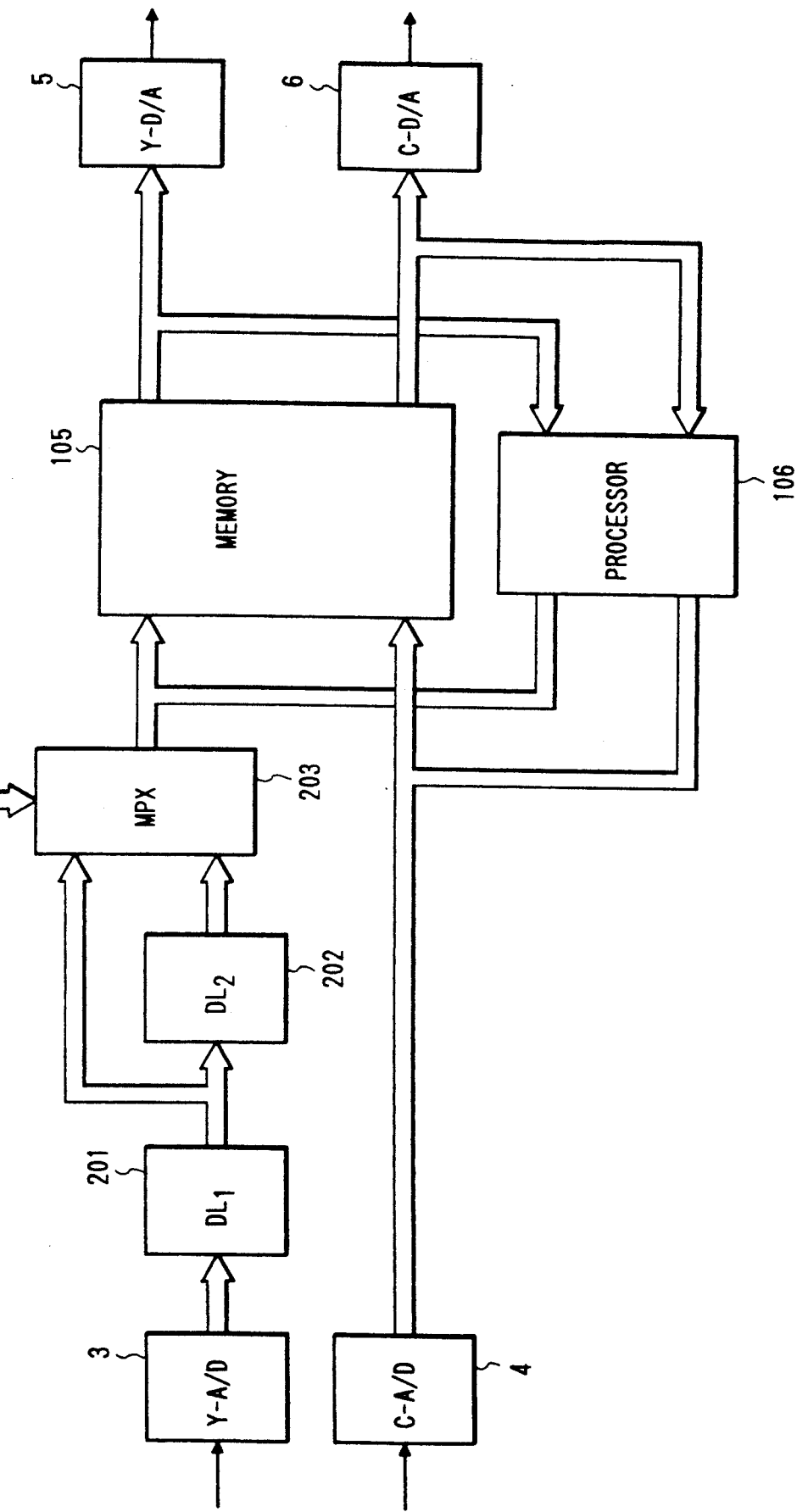
FIG. 13 is a block diagram showing still another example of the circuit shown in FIG. 9.

In the foregoing embodiments, the time difference, resulting from the difference in processing time of the luminance signal and the color difference signal in the recording or reproducing circuits, is compensated by the control of write-in address of the image data into the memory according to the operation mode, but said compensation of the time difference may be achieved by another data processing, as will be exemplified in FIG. 13.

In an embodiment shown in FIG. 13, said time difference is compensated by a circuit capable of the varying the delay time depending on the operating mode, such as a recording or a reproducing mode.

In FIG. 13, there are provided digital delay circuits DL1, DL2 (201, 202) for delaying the input signal by predetermined periods, and a multiplexer 203 for obtaining a delay time corresponding to each mode, by selecting the outputs of the delay circuits DL1, DL2 according to an input signal from the system controller 2.

In the present embodiment, the system controller selects the output of the DL2 or DL1 respectively in the recording or reproducing mode, as the time difference is larger in the reproducing mode than in the recording mode.

Thus the correction of time difference according to the operating mode can be achieved with a further simplified structure.

In the present embodiment there are employed only two digital delay circuits DL1, DL2 for the purpose of simplicity, but there may be provided additional delay circuits for additional regulation of the delay time, in preparation for additional operating modes, such as the recording of an externally entered signal.

As explained in the foregoing, the embodiments shown in FIGS. 8 to 13 allows correction of the time difference between the luminance signal and the color difference signal, varying according to the operating mode, by varying the amount of delay in digital signals or the timing of signal write-in or read-out of the memory, thereby preventing the color aberration in the image signal without deterioration in the signal or increase in the size of the apparatus.

Also the embodiments shown in FIGS. 8, 9 and 10 have the additional advantage that the space occupied by the IC chips scarcely increases, because, in the embodiment shown in FIGS. 9 and 10, only the programmable decoder 103 or the programmable decoders 110, 111 are newly added, as the counter, decoder and address counter for CSync signal generation are any ay indispensable.

What is claimed is:

1. An image processing apparatus comprising:
   a) a recording process circuit for applying a recording process based on given luminance data and color data;
   b) a reproducing process circuit for applying a reproducing process on said given luminance data and color data;
   c) an image memory used in common for said recording process circuit and said reproducing process circuit; and
   d) means for varying the state of write-in into or read-out from said image memory on at least one of said luminance data and said color data, according to the state of operation of said recording process circuit and said reproducing process circuit, wherein said means for varying compensates a processing time difference between a time of processing of the luminance data and a time of processing of the color data by said recording process circuit and said reproducing process circuit.

2. An image processing apparatus according to claim 1, wherein said recording process circuit includes means for low-pass filtering of said luminance data and said color data.

3. An image processing apparatus according to claim 1, wherein said reproducing process circuit includes means for demodulation of said luminance data and said color data.

4. An image processing apparatus comprising:
   a) process means for processing given luminance data and color data separately in respectively different process modes;
   b) an image memory serially connected to said process means; and
   c) means for controlling the state of write-in or read-out of said image memory for compensating a difference in delay time of said luminance data and said color data in said process means, wherein said means for controlling varies the state of the write-in or read-out according to the process mode of said process means.

5. An image processing apparatus according to claim 4, wherein said process means includes a demodulation process.

6. An image processing apparatus according to claim 4, wherein said processing means includes a filtering process.

* * * * *

UNITED STATES PATENT AND TRADEMARK OFFICE
CERTIFICATE OF CORRECTION

PATENT NO. : 5,223,942

DATED : June 29, 1993

INVENTOR(S) : YUJI SAKAEGI, ET AL.

Page 1 of 3

It is certified that error appears in the above-identified patent and that said Letters Patent is hereby corrected as shown below:

Title page, item:

[56] REFERENCES CITED

U.S. PATENT DOCUMENTS

Insert: --4,780,756  10/1988  Shiota
        4,451,857   5/1984   Mikado--.

FOREIGN PATENT DOCUMENTS

--2144292A  2/1985  United Kingdom
0293217    11/1988  Eur. Pat. Off.--.

COLUMN 2

Line 10, "even" should read --even if--.

COLUMN 3

Line 30, "FIG. 9;" should read --FIG. 9.--.

COLUMN 4

Line 64, "converter 28;" should read --converter 28,--.

UNITED STATES PATENT AND TRADEMARK OFFICE
CERTIFICATE OF CORRECTION

PATENT NO. : 5,223,942

DATED : June 29, 1993

INVENTOR(S) : YUJI SAKAEGI, ET AL.

It is certified that error appears in the above-identified patent and that said Letters Patent is hereby corrected as shown below:

IN THE DRAWINGS

SHEET 5, FIGURE 9

"PROGRAMING" should read --PROGRAMMING--; and "PROGRAMABLE" should read --PROGRAMMABLE--.

SHEET 6, FIGURE 10

"PROGRAMING" should read --PROGRAMMING--; and "PROGRAMABLE" (both occurrences) should read --PROGRAMMABLE--.

SHEET 7, FIGURE 11A

"PROGRAMABLE" should read --PROGRAMMABLE--.

UNITED STATES PATENT AND TRADEMARK OFFICE
CERTIFICATE OF CORRECTION

PATENT NO.   :   5,223,942

DATED        :   June 29, 1993

INVENTOR(S)  :   YUJI SAKAEGI, ET AL.

It is certified that error appears in the above-identified patent and that said Letters Patent is hereby corrected as shown below:

COLUMN 5

Line 5, "$3f_{sc}$" should read --$3f_{sc}$.--.
Line 44, "As image" should read --¶ An image--.
Line 50, "synchronization signals" should read --synchronization signal S, and line-sequential color difference signals--.

COLUMN 8

Line 66, "S-terminal" should read --S-terminal.--.

COLUMN 10

Line 3, "obtained" should read --obtained.--.
Line 14, "read-out" should read --is read out--.
Line 29, "the" should be deleted.
Line 55, "allows" should read --allow--.

Column 11
Line 1, "ay" should read --way--.

Signed and Sealed this

Twenty-sixth Day of April, 1994

*Attest:*

BRUCE LEHMAN

*Attesting Officer*   Commissioner of Patents and Trademarks